United States Patent [19]

Greskovich et al.

[11] 4,221,594
[45] Sep. 9, 1980

[54] MATERIAL COMPOSITION FOR FIRED CERAMIC ARTICLES HAVING A HIGH DEGREE OF POROSITY AND CRUSHABILITY CHARACTERISTICS

[75] Inventors: Charles D. Greskovich, Schenectady; Frederic J. Klug, Amsterdam; Wayne D. Pasco, Ballston Lake, all of N.Y.

[73] Assignee: General Electric Company, Schenectady, N.Y.

[21] Appl. No.: 840,023

[22] Filed: Oct. 6, 1977

[51] Int. Cl.$^2$ ............................................. C04B 00/00
[52] U.S. Cl. ................................. 106/40 R; 106/38.9; 106/41; 106/43; 106/56; 106/63; 106/65; 106/73.4; 106/288 B; 106/307; 164/132; 264/44
[58] Field of Search ................... 106/73.4, 65, 63, 62, 106/56, 40 R, 41, 43, 44, 55, 39.5, 38.9; 264/44, 43, 63, 132, 138

[56] References Cited

U.S. PATENT DOCUMENTS

| | | | |
|---|---|---|---|
| 3,078,173 | 2/1963 | Dolph | 106/63 X |
| 3,135,696 | 6/1964 | Ruelle et al. | 106/286 X |
| 3,248,241 | 4/1966 | Rifai | 106/65 X |
| 3,312,558 | 4/1967 | Miller | 106/63 |
| 3,969,124 | 7/1976 | Stewart | 106/65 X |
| 4,013,477 | 3/1977 | Jatkar | 106/73.4 |
| 4,020,134 | 4/1977 | Gordon et al. | 264/43 |
| 4,031,177 | 6/1977 | Auriol et al. | 106/65 X |

OTHER PUBLICATIONS

Gitzen, W. H. "Alumina as a Ceramic Material", 1970, pub. by Am. Cer. Soc., pp. 27–28, 30, 36–38, 104–105, 130–131.

*Primary Examiner*—Helen M. McCarthy
*Attorney, Agent, or Firm*—Donald M. Winegar; James C. Davis, Jr.; Leo I. MaLossi

[57] ABSTRACT

A reactant fugitive filler material is employed in a material composition which includes alumina-based ceramics of one or more particle sizes. The reactant fugitive material provides sufficient reactant material at an elevated temperature to form a fired ceramic article which has a porous microstructure in which the grain morphology is characteristic of grains which have undergone vapor phase transport action.

13 Claims, 2 Drawing Figures

MATERIAL COMPOSITION FOR FIRED CERAMIC ARTICLES HAVING A HIGH DEGREE OF POROSITY AND CRUSHABILITY CHARACTERISTICS

BACKGROUND OF THE INVENTION

1. Field of the Invention

This invention relates to improvements in investment casting and to material compositions for making alumina cores for employment therewith.

2. Description of the Prior Art

The production of directionally solidified (DS) metal eutectic alloys and superalloys for high pressure turbine (HPT) airfoils with intricate internal passageways for air cooling requires that the core and mold not only be dimensionally stable and sufficiently strong to contain and shape the casting but also be sufficiently weak to prevent mechanical rupture (hot tearing) of the casting during solidification and cooling. The DS process requirements of up to 1875° C. for a 16 hr. time period imposes severe constraints on materials which may serve as mold or core candidates.

The prior art appears to be mostly limited to the use of silica or silica-zircon core and mold materials. At temperatures greater than 1600° C. the silica based materials fail from the standpoint of both mechanical integrity and chemical incompatibility with the advanced alloy compositions.

Dimensional control of the silica core is excellent since cristobalite exhibits very little densification. Microstructural examination reveals that, in some cases, commercial core compositions employ very large particles (>100 µm). The addition of large particles serves to both lower shrinkage and mechanical strength.

Paul S. Svec in "Process For Making an Investment Mold For Casting And Solidification of Superalloys Therein", Ser. No. 590,970, teaches the use of alumina-silica compositions for making molds and cores. Charles D. Greskovich and Michael F. X. Gigliotti, Jr. in U.S. Pat. Nos. 3,955,616 and 3,972,367 teach cores and molds of alumina-silica compositions which have a barrier layer of alumina formed at the mold/metal interface. One possible means for the formation of their alumina layer is by a chemical reaction wherein carbon of the susceptor chemically reduces the material composition of the mold or core. Charles D. Greskovich, Ser. No. 698,909, also teaches an alumina-silica composition wherein the material is of a predetermined size so as to favor, and therefore, enable, the formation of metastable mullite for molds and cores which exhibit superior sag resistance at high temperatures.

Certain alumina-based ceramics such as $Na_2O.9Al_2O_3$, without a chemical or physical binder material, has been identified as a potential core and mold material based on both chemical compatibility and leachability considerations. There is, however, a considerable thermal expansion mismatch between the ceramic and the alloy which generates, around the ceramic core, hoop and longitudinal tensile stresses in the alloy on cooling from the DS temperature. The high elastic modulus and high resistance to deformation at elevated temperatures of dense ceramic and its lower coefficient of thermal expansion than the alloy result in the mechanical rupture or hot tearing of the alloy.

A mechanism by which a ceramic core body can deform under the strain induced by the cooling alloy must be developed to permit the production of sound castings. The microstructure of the ceramic core and mold must be tailored to permit deformation under isostatic compression at a stress low enough to prevent hot tearing or cracking of the alloy. The surface of the core and mold must also serve as a barrier to metal penetration.

The material composition of the core is not only determined by the casting conditions to be encountered but also by the method of manufacturing the core and the method of removal of the core from the casting.

Should the shape of the core be a simple configuration, one may be able to make a core by mixing the constituents, pressing the mix into a predetermined shape and sintering the shape for strength for handling.

The production of a core such as required for the intricate internal cooling passages of a high pressure turbine airfoil or blade necessitates the use of a process such as injection or transfer molding. In injection molding, the molding compound must be capable of injection in a complex die in a very short time with complete die filling. Furthermore, the molding compound must flow readily without requiring excessive pressure which could result in die separation and extrusion of material out through the seams. Excessive pressure must also be avoided to prevent segregation of the liquid binder and the solids. A sufficient amount of a plasticizing vehicle will accomplish these requirements. However, a primary requirement of an injection molding compound is that the volume fraction of solids in the body must be greater than 50% at the injection temperature. Should the solids loading be less than 50% by volume, the solids may become a discontinuous phase. Upon removal of the plasticizing material from the core, the lack of particle contact will result in disintegration of the core specimen. High porosity and, therefore, low density structures in the sintered core specimen are required to minimize its compressive strength.

An object of this invention is to provide a new and improved material composition embodying a reactant fugitive filler material for making cores for casting directionally solidified eutectic and superalloy materials.

Another object of this invention is to provide a new and improved material composition for making cores for casting directionally solidified eutectic and superalloy materials wherein carbon or another reactant fugitive filler is employed to increase the porosity and crushability characteristics of ceramic articles made therefrom.

A further object of this invention is to provide a reactant fugitive filler which is a primary source of carbon or other suitable reactant material at an elevated temperature to chemically reduce alumina-based ceramic compounds in a new and improved material composition for cores and to produce porosity within the core.

Other objects of this invention will, in part, be obvious and will, in part, appear hereinafter.

BRIEF DESCRIPTION OF THE INVENTION

In accordance with the teachings of this invention there is provided a new and improved material composition for making fired ceramic articles suitable for use in the investment casting of directionally solidified eutectic and superalloy materials. The material composition includes at least one alumina-based ceramic compound material selected from the group consisting of $Na_2O.9Al_2O_3$—$Na_2O.11Al_2O_3$, $CaO.6Al_2O_3$, $SrO.6Al_2O_3$ and BaO.6Al$_2$O$_3$ and at least one reactant fugitive filler material. Alternately, a mixture of the alumina-based compound and alumina, in combination with a reactant fugitive filler material, has also been found to be an excellent material composition for making fired ceramic cores. A suitable reactant material is a carbonaceous material. The carbonaceous fugitive filler material provides carbon at an elevated temperature to chemically reduce the alumina-based ceramic compound to provide a fired ceramic article which has a porous microstructure in which the grain morphology is characteristic of grains which have undergone vapor phase transport action. The preferred source of carbon is particulate carbon in the form of graphite. The particle size of the material is preferably less than 100 μm. Other suitable carbonaceous materials are aluminum carbide, boron carbide, aluminum oxycarbide and organic materials. Suitable organic materials are those which decompose and provide the carbon for the chemical reduction reaction with the alumina-based ceramic compound. The remainder of the organic material is preferably evolved as a gaseous product which is not detrimentally active with the alumina-based ceramic compound. Metals such as aluminum and boron are suitable for use as a reactant filler material.

DESCRIPTION OF THE INVENTION

Figure 1:
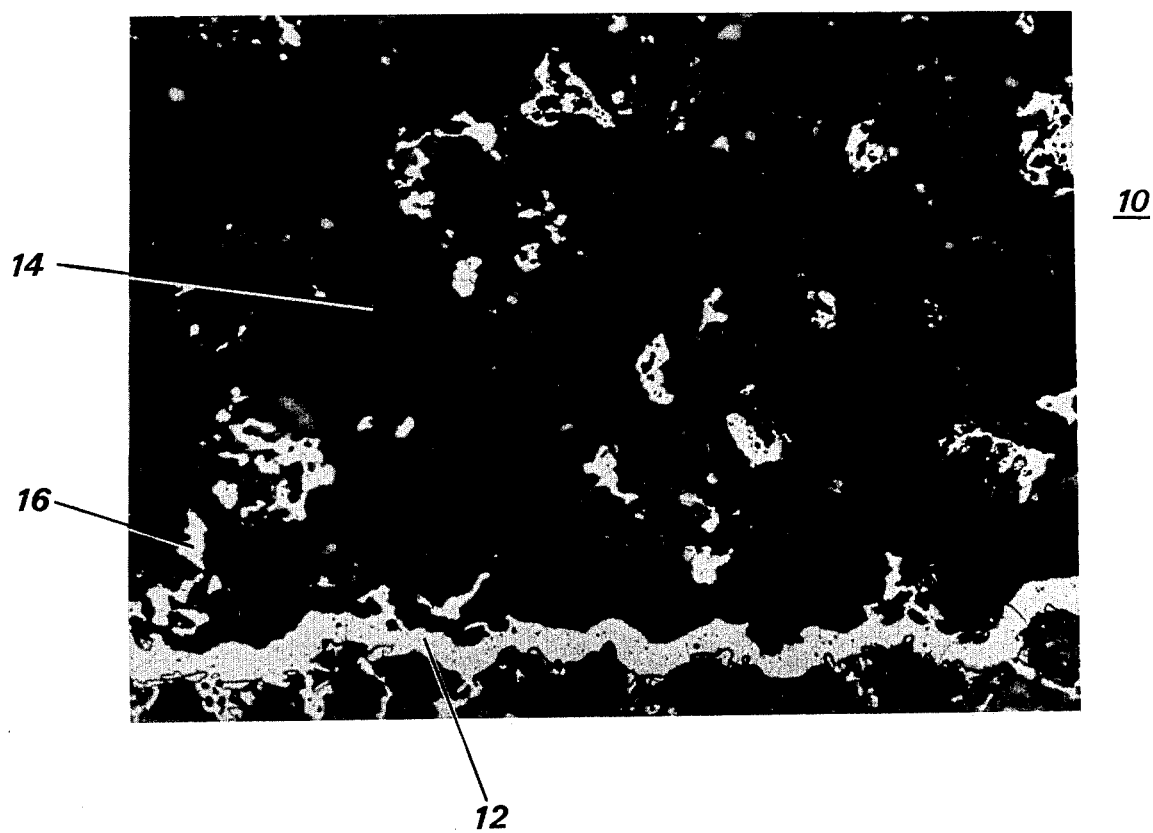
FIG. 1 is a photomicrograph showing the morphology of the alumina grain structure of a fired compact at 300×.

Alumina-based compounds such as Na$_2$O.9Al$_2$O$_3$—Na$_2$O.11Al$_2$O$_3$, CaO.6Al$_2$O$_3$, SrO.6Al$_2$O$_3$ and BaO.6Al$_2$O$_3$ have been discovered to be suitable materials for use in making cores for use in casting directionally solidified eutectic alloy and superalloy materials. All of these materials have a minimum temperature at which a liquid phase forms between the compound and alumina (Al$_2$O$_3$) which is greater than 1800° C. which is the predicted maximum temperature that will be imposed upon the ceramic core material during directional solidification. The alumina-based compounds may comprise at least in part the ceramic material composition used in preparing a ceramic core from the composition. The material composition may consist essentially of 100 parts by weight of an individual alumina-based compound or, alternately, the composition may comprise a two phase mixture of from about 60 parts by weight to 100 parts by weight of the alumina-based compounds, balance alumina. When a compact of the material composition, without a reactant fugitive filler material present therein, is fired to make the core, a continuous phase of the selected alumina-based compound is formed in situ by sintering which provides either an interconnected network of both solid and pores or, when excess alumina is added, a dispersion of particles of alumina within a matrix of each of the alumina-based compounds.

Fired compacts of any of these material compositions, when employed as cores in the casting and directional solidification of eutectic and superalloy materials, are easily removed therefrom by a caustic autoclave processing technique. Removal is achieved by leaching away the interconnected solid network with a caustic agent of either a KOH or a NaOH solution.

Another particular feature of material compositions embodying two phase ceramic cores is that the activity of the alumina in the core is nearly equal to that of pure alumina. The activity of the other oxide constituent in the phase mixture, such, for example as Na$_2$O, is considerably reduced so as to reduce its chemical potential and consequently reduce the possible chemical reactivity with molten superalloys at elevated temperatures.

The sodium aluminates and their solid solutions in the compositional range described heretofore, also known as β-alumina, are preferred for making the ceramic cores. Cores made from material compositions including one or more of these sodium aluminates are leachable in a 20% NaOH or KOH solution, 200° C. to 350° C., in a steam autoclave. The process is economical and fairly fast, the leaching rate being on the order of 0.5–1 centimeters per hour.

The material composition for core making is prepared by mixing the materials together mechanically. A sufficient amount of the material composition, with or without a binder material admixed therein, is placed in a mold and pressed to a green compact having a desired configuration. The green compact of about 40 to 60% theoretical density is fired at a temperature of from about 1600° C. to 1850° C. to form a porous core whose material structure is characterized by interconnected porosity co-exsisting with either an interconnected network of alumina-based ceramic compound or particles of alumina within a matrix of alumina-based compounds. The density of the fired compact varies with the initial particle size(s) of the materials employed. For a range of particle size of from about 10 microns to about 80 microns, the density of the fired compact ranges from about 40 percent to about 70 percent of the theoretical density.

To further illustrate the teachings of this invention, a core 8 cm×0.6 cm was made of substantially 100 parts by weight β-alumina material (Na$_2$O.9Al$_2$O$_3$). The average particle size of the material used was about 35 microns. The compact was formed at a pressure of 10,000 psi and fired at 1780° C.±10° C. in air to sinter the compact for ease of handling. The density of the sintered rod was 55 percent. A melt of NiTaC-13 alloy was prepared, cast about the rod and directionally solidified thereabout at a temperature of 1675° C.±25° C. for 20 hours in a controlled atmosphere at 10% CO+argon gas.

Upon completion of the directional solidification, examination of the mold-metal interface was made by means of a metallographic polished-section of the β-alumina/NiTaC-alloy interface. A thin reaction zone 10 microns in thickness was observed at the interface. The composition of the material of the reaction zone was α-Al$_2$O$_3$. No evidence of hot tearing was observed along the interface. The tantalum carbide strength reinforcing phase was still present in the cast alloy matrix even at the β-alumina/NiTaC-13 interface. The formation of the thin reaction zone did not hinder the development of the carbide phase near the interface. Upon further examination, no significant penetration of the core had been made by the cast metal and the surface of the casting was commercially acceptable.

To increase the porosity content, by volume, of the core and to enhance the crushability characteristics, as well as to provide an integral outer barrier layer to aid in the prevention of metal penetration, the initial material composition may include a reactant fugitive filler material.

Figure 2:
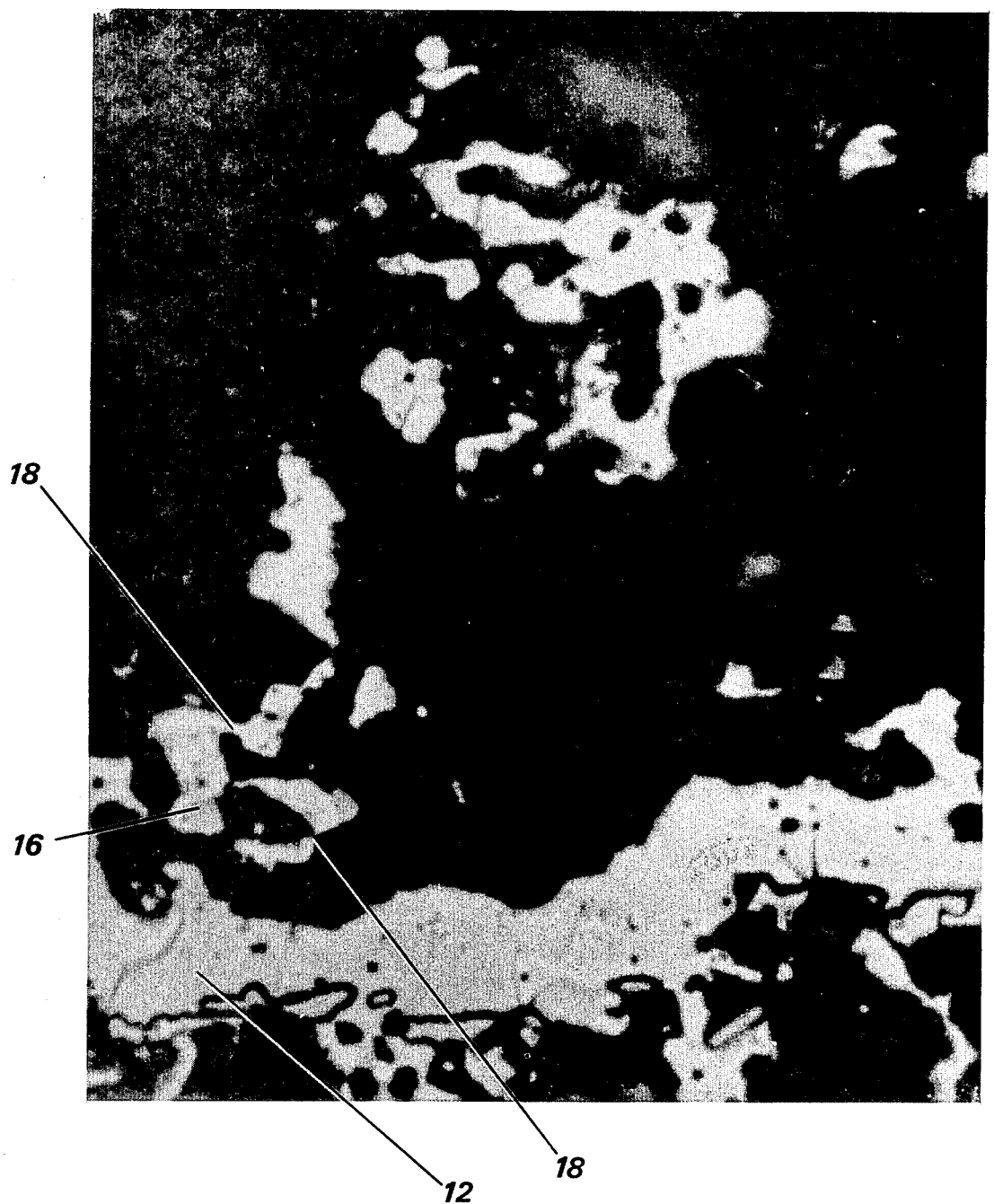
FIG. 2 is an enlarged view of a portion of the photomicrograph of FIG. 1.

With reference to FIGS. 1 and 2 there is shown a portion of a fired compact 10 made from an alumina-based ceramic material composition of this invention embodying a reactant fugitive filler material. The fired compact 10 is made from alumina-based material fired in a controlled atmosphere to form a layer 12 of alumina as an outer portion encompassing and integral with a central portion 14 of alumina. The determination that the identity of the resulting solid phase was α-alumina was confirmed by x-ray diffraction and electron microprobe chemical analysis. Hence, the alumina-based ceramic material is transformed into α-alumina by the use of the fugitive filler and proper heat treatment. The alumina of the layer 12 is dense, that is, any porosity therein is discontinuous. The structure of the material of the central portion 14 is porous and the porosity is continuous throughout.

To increase porosity in the fired compact a reactant fugitive filler material is desirable as previously stated. Upon a subsequent firing at an elevated temperature, the reactant fugitive filler is "burned" off in a suitable manner to increase the porosity of the compact 10. A desirable reactant fugitive filler material is one which will also react with the alumina-based ceramic material to eliminate or remove a portion thereof from the compact 10 and thereby increase the porosity content further. Suitable fugitive filler materials are those which will provide enough reactant material at the elevated temperature to reduce a portion of the alumina-based ceramic material which is removed from the compact in the gaseous state and which, in part, is either deposited on other alumina grains by vapor phase transport action causing a coarsening and a rounding thereof or oxidized to form the integral outer portion 12 of alumina. Preferred reactant bearing materials are graphite, aluminum, aluminum carbide, aluminum oxycarbide, boron and boron carbide. Suitable organic materials may also be employed as reactant materials as a carbon source.

As better illustrated with reference to the Figure, the microstructure of the central portion 14 of the fired compact 10 has a porosity which is continuous throughout. Additionally, examination of the alumina grains 16 clearly indicates a grain morphology which is characteristic of alumina grains which have undergone vapor phase transport action. The vapor transport action involves the evaporation and/or formation of a gaseous suboxide of a portion of material of one grain at high surface energy regions of the grain and the transportation of the material to low surface energy regions of the grain where it condenses or is oxidized. By this action, grain rounding and coarsening takes place. Aluminum suboxide gaseous species are transported away from the center portion 14 of the compact 10 where at least some of the species is oxidized at the outer surface thereof to form the integral outer portion 12 of alumina. As a result of the chemical reaction producing this vapor transport action, the fired compact registers a weight loss. Further, the vapor transport action results in a network of narrow connecting bridges 18 between the alumina particles or grains 16.

The compact 10 is suitable for use as a core in investment casting of directionally solidified eutectic and superalloy materials. It is desirable for the cooling passages of the turbine blade to have a complex configuration. Therefore, it is necessary for the compact or core to have a complex shape. The preferred method of forming the compact or core 10 in an unfired state is by injection or transfer molding. The preferred material for the compact or core 10 is alumina-based materials because such materials react least with Al bearing alloys, such as NiTaC-13, which are cast at temperatures in excess of 1600° C. and as high as 1850° C. for directional solidification times in excess of 16 hours.

An added benefit derived from the use of a reactant fugitive filler material is that the compact 10 is more easily removed from the casting by leaching in a KOH or a NaOH solution in an autoclave. The leaching rate has been discovered to be dependent upon the porosity of the compact 10. If one can manufacture a compact 10 with a porosity content of from 60 percent to 70 percent by volume, a very significant increase in the leaching rate of the compact 10 can be obtained. Additionally, the compact 10 would make an acceptable core for making turbine blades wherein the wall thickness is about 0.060 inch or less since it will have good crushability characteristics.

The particle size of the alumina-based ceramic material or mixtures of alumina-based ceramic material and alumina is important. It is desirable that the size of the pores in the compact, particularly at the outside surfaces which contact the cast metal, be small enough to prevent any significant metal penetration. It is desirable that metal penetration of the compact surface be minimized in order to obtain the best surface finish of the cast part. The integral outer portion 12 of alumina functions as a barrier layer to prevent metal penetration into the core structure. The particle size of the alumina-based ceramic compound or a mixture of this with excess alumina is less than about 100 microns. Similarly, the carbon-bearing material should have a particle size less than 100 microns. The preferred particle size for each of these ingredients is from 1 to 50 microns.

In order to describe the invention more fully, and for no other reason, the reactant fugitive filler material is said to be a carbon-bearing material. The amount of carbon-bearing material added to the core composition mix is dependent upon the porosity desired in the fired core as well as the average particle size of the alumina-based ceramic compound. Excellent results have been found when the molar ratio, defined as 1 mole of carbon per mole of $Al_2O_3$ in the ceramic compound or mixture, is about 0.1 to 1.0. Above 1.0, conditions can exist where the fired ceramic article will have insufficient strength for handling during subsequent processing. The graphite is retained in the bisque ceramic during heating until the alumina-based compound begins to sinter and develops strength at inter-particle contacts. The graphite can now be removed from the structure, or compact, without producing a discontinuous solid phase that could cause distortion of the compact.

The expected chemical reactions between the alumina-based ceramics and carbon, and between alumina (added to the alumina-based ceramic compound) and carbon, occur at temperatures near or above 1500° C. in a reducing or inert atmosphere and produce in part volatile suboxides of alumina. The possible reactions which can take place in a hydrogen (reducing) atmosphere are most likely:

$$Na_2O \cdot 9Al_2O_3(s) + 10C(s) \rightleftarrows 2Na(g) + 18AlO(g) + 10CO(g) \quad (1)$$

$$MO \cdot 6Al_2O_3 + 7C(s) \rightleftarrows M(g) + 12AlO(g) + 7CO(g) \quad (2)$$

$$Al_2O_3(s) + C(s) \rightleftarrows 2AlO(g) + CO(g) \quad (3)$$

$$Na_2O_3 \cdot 9Al_2O_3(s) + 19C(s) \rightleftharpoons 2Na(g) + 9Al_2O(g) + 19CO(g) \quad (4)$$

$$MO \cdot 6Al_2O_3(s) + 13C(s) \rightleftharpoons M(g) + 6Al_2O(g) + 13CO(g) \quad (5)$$

$$Al_2O_3(s) + 2C(s) \rightleftharpoons Al_2O(g) + 2CO(g) \quad (6)$$

with reactions 4–6 being the most probable reactions to occur. The symbol designated as "M" in the above reactions may be Ca, Sr or Ba.

At temperatures above 1500° C., the vapor pressure of aluminum suboxide is significant. As the vapor pressure increases, mass transport by an evaporation-condensation type mechanism can occur. If the rate of mass transport through the vapor phase is much greater than mass transport by volume or grain boundary diffusion, the material is merely rearranged in the compact and no reduction in the pore volume (i.e. densification) can take place. In the reducing or inert atmosphere, the aluminum suboxide can escape thereby lowering the density of the compact or fired ceramic and producing the microstructure of the central portion 14 of the compact 10 as illustrated in the Figure.

The effect of carbon additions, in the form of graphite, on the weight loss of the ceramic article when fired in a reducing atmosphere, such as hydrogen, is a function of the heating rate and the atmosphere above about 900° C.

When the heating rate is less than the order of about 100° C. per hour in the temperature range of from about 900° C. to about 1550° C., with oxygen as an impurity in the controlled atmosphere, the expected porosity content or the percent decrease in fired density, is not obtained. In fact there is quite a difference noted. Apparently, the carbon reacts with the gaseous oxygen impurity to form gaseous CO and $CO_2$, which escapes from the compact. Consequently, insufficent carbon is available above about 1550° C. to give rise to a gaseous suboxide of alumina and produce the fired compact of desired porosity content.

Controlled atmospheres for firing the compact to obtain the desired chemical reactions may be of a reducing type or of an inert gas type. Dry or wet hydrogen may be employed as a reducing gas type atmosphere. Argon, helium, neon and the like may be utilized for atmospheres of the inert gas type.

The effects of carbon additions on the linear shrinkages of the fired ceramic is dependent upon the molar ratio of carbon to $Al_2O_3$ compound (and excess alumina), the amount of oxygen impurity in the atmosphere and the heating rate.

As the molar ratio of carbon to the alumina is increased the percent linear shrinkage of the compact is decreased. This molar ratio may be inadvertently reduced in the compact during the firing if oxygen impurities in the atmosphere oxidize a portion of the carbon in the compact to CO or $CO_2$. The effect of oxidation of carbon was shown by varying the heat rate. When a slow heating rate is used, the carbon to alumina ratio is lowered by oxidation of carbon and the compacts undergo high shrinkages. When a fast heating rate is used the ratio of carbon to alumina is not greatly affected by oxidation of carbon and low shrinkages result. If the firing atmosphere was completely free of any oxygen or water vapor the resulting linear shrinkage would be independent of the heating rate used and only be a function of the initial carbon content. For example, when the ratio of carbon to $Al_2O_3$ is about 0.75, the linear shrinkage is less than 1% if a fast heating rate is practiced when the controlled atmosphere includes the presence of oxygen as an impurity therein. In contrast, under the same conditions, with a low or slow heating rate, a linear shrinkage as high as 4% has been observed. A low core shrinkage is desirable in producing the required close dimensional tolerances of the cast part. The heating rate of the ceramic article does have a profound effect on the shrinkage when oxygen is present as an impurity or deliberately added to aid the formation of the alumina barrier layer 12.

The percent linear shrinkage is also dependent on the grain size of the alumina-based ceramic compound and the alumina flour which may be admixed with it. A larger grain size material, if employed, will decrease the percent linear shrinkage which will occur. Therefore, as stated previously, the grain size of these ingredients employed in making the fired compact 10 is preferably from about 1 micron to about 50 microns.

The percent weight loss due to the loss of carbon and/or alumina-based ceramic material is dependent upon the firing temperature. Above about 1500° C., the loss becomes appreciable and is related to molar ratio of carbon to $Al_2O_3$ in the alumina-based ceramic material. The greater effect is noted when the molar ratio is of the order of 0.75 and above. Weight losses of 20 to 30 wt.% are common.

The following teachings of this invention reveal the effects on the dewpoint of the hydrogen gas. Equivalent partial pressures of oxygen in inert gases can also be employed to form the desired structure of the fired compacts. However, for purposes of illustration only, and for no other reason, the invention is further described employing hydrogen gas having a given dewpoint range.

In order to form the outer portion 12 of alumina while achieving the desirable microstructure of the inner portion 14, the compact 10 is fired at the elevated temperature of about 1550° C. and upwards in an atmosphere of controlled dewpoint hydrogen gas. The wet hydrogen gas has a dewpoint of from about −5° F. to no greater than about +25° F. Preferably, the dewpoint of the hydrogen gas should be greater than about 0° F. Suitable inert gases are argon, helium, neon and the like containing the desired partial pressure of oxygen.

It is preferred not to have the dewpoint exceed +25° F. since the compact undergoes less of a weight loss and the reaction times become increasingly longer with increasing dewpoint values above about +25° F. This may be occurring as a result of the following reaction between water of the wet hydrogen gas and the reactant fugitive material carbon.

$$H_2O + C \rightarrow CO\uparrow + H_2\uparrow \quad (7)$$

wherein the greater the amount of $H_2O$ available for reacting with the carbon causes the compact to lose greater amounts of carbon through oxidation.

The outer portion 12 has a thickness which may vary from 5 microns or less to about 100 microns. The firing temperature has a range of from 1650° C. to about 1900° C. with a preferred range of from about 1750° C. to about 1850° C. The compact is fired in this range for a period of from about 15 minutes to about 4 hours in order to achieve the range of thickness of the outer portion 12.

The core, or compact, is heated at a rate of 100° C. per hour or greater. Preferably above about 1300° C., the heating rate is increased until it is greater than about 200° C. per hour and is practiced up to an elevated temperature of about 1650° C. or greater, depending upon the end use of the compact, or core. Upon reaching the elevated temperature, isothermal heating is practiced for a sufficient time for the carbon available to react with the alumina-based ceramic compound present to produce the desired level of porosity in the fired compact.

Any excess carbon in the fired compact is removed by heating the fired compact in an oxidizing atmosphere at a temperature greater than 900° C. Unbound carbon should be removed from the fired compact to prevent possible "boiling" of the cast metal during the practice of solidification of eutectic and superalloy materials.

Gaseous suboxides of alumina form in a reducing atmosphere above about 1550° C. to form the desired porous microstructure of the compact 10. The outer barrier region 12 which consists of a dense continuous layer of alumina is formed by oxidation of a portion of the aluminum suboxide at the surface of the compact 10. The remainder of the gaseous aluminum suboxides and the alkali or alkaline earth metal vapors which are not employed in forming the barrier layer 12 escape from the compact 10 into the furnace atmosphere. The formation of the dense continuous barrier layer 12 occurs at dewpoints of greater than −5° F. in hydrogen concomitant with a furnace temperature of greater than 1550° C. The preferred condition for formation of a dense continuous barrier layer 12 is a dewpoint of from about +0° F. to about +25° F. for hydrogen gas, and the equivalent range of partial pressure of oxygen in a suitable inert gas, concomitant with a furnace temperature range of from about 1750° C. to about 1850° C.

However, when the controlled atmosphere is substantially pure, that is free of oxygen as a contaminant, then other alternate firing schedules may be practiced. It is significant to note that when the gases of the controlled atmosphere are substantially free of oxygen, that is has little or no oxygen present therein, the heating rate for the compact is governed only by the compact's inherent thermal shock capability.

When the fugitive reactant material is either aluminum or boron, the probable chemical reactions between $Na_2O.9Al_2O_3$, for example, and aluminum and boron, include the following:

$$Na_2O.9Al_2O_3 + 38Al \rightarrow 28Al_2O(g) + 2Na(g) \quad (8)$$

$$Na_2O.9Al_2O_3 + 10Al \rightarrow 28AlO(g) + 2Na(g) \quad (9)$$

$$Na_2O.9Al_2O_3 + 19B \rightarrow 9Al_2O(g) + 19BO(g) + 2Na(g) \quad (10)$$

$$Na_2O.9Al_2O_3 + 10B \rightarrow 18AlO(g) + 10BO(g) + 2Na(g) \quad (11)$$

The teachings of this invention have been directed toward compacts employed as cores having a complex shape wherein metal cast about the core has a wall thickness of the order of 0.060 inch or less. Therefore, "hot cracking" is critical. When the wall thickness of the cast metal is greater, less porosity is required as the metal has strength to resist the forces exerted by the core. In such instances porosities less than 50 percent by volume can be tolerated. Therefore, compacts for such cores may be prepared with smaller amounts of the reactant fugitive filler.

We claim as our invention:

1. A material composition suitable for use in making fired compacts consisting of
   100 parts by weight of a ceramic material which is an alumina-based ceramic compound which has a minimum temperature at which a liquid phase forms between the compound and alumina which is greater than 1800° C., and
   a reactant fugitive filler mixed in the ceramic in a given molar ratio of reactant to alumina, which provides a sufficient reactant at an elevated temperature to chemically reduce the alumina of the ceramic material to produce at least one volatile species which produces an increased degree of continuous porosity in the ceramic compact, wherein
   the alumina-based ceramic compound has the general formula $MO.NAl_2O_3$, and
   M is $Na_2$, Ca, Sr, or Ba,
   N is from 9 to 11 when M is $Na_2$, and
   N is 6 when M is Ca, Sr, or Ba,
   the reactant fugitive filler is one selected from the group consisting of carbon, aluminum, aluminum carbide, aluminum oxycarbide, boron and boron carbide, and
   the particle size of the ceramic material is less than about 100 μm.

2. The material composition of claim 1 wherein the particle size of the ceramic material is from 1 micron to 50 microns.

3. The material composition of claim 2 wherein the reactant fugitive filler is carbon.

4. The material composition of claim 1 wherein the reactant fugitive filler is carbon.

5. The material composition of claim 3 wherein the molar ratio of carbon to alumina in the ceramic is from about 0.1 to 1.0.

6. The material composition of claim 4 wherein the molar ratio of carbon to alumina in the ceramic is from about 0.1 to 1.0.

7. The material composition of claim 1 wherein the alumina-based ceramic compound material is $$Na_2O.9Al_2O_3 - Na_2O.11Al_2O_3.$$

8. The material composition of claim 7 wherein the particle size of the ceramic material is from 1 micron to 50 microns.

9. The material composition of claim 7 wherein the reactant fugitive filler material is carbon.

10. The material composition of claim 9 wherein the molar ratio of carbon to alumina in the ceramic is from about 0.1 to 1.0.

11. The material composition of claim 3 wherein the particle size of the carbon is less than about 100 microns.

12. The material composition of claim 10 wherein the reactant fugitive filler is carbon of a particle size of less than 100 microns.

13. The material composition of claim 5 wherein the particle size of the carbon is less than about 100 microns.

* * * * *